US006610775B1

(12) United States Patent
Oharu et al.

(10) Patent No.: US 6,610,775 B1
(45) Date of Patent: Aug. 26, 2003

(54) WATER- AND- OIL REPELLENT COMPOSITION AND PROCESS FOR PRODUCING THE SAME

(75) Inventors: Kazuya Oharu, Yokohama (JP); Yuriko Kaida, Yokohama (JP); Toyomichi Shimada, Yokohama (JP); Takashige Maekawa, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/869,330

(22) PCT Filed: Jan. 20, 2000

(86) PCT No.: PCT/JP00/00257

§ 371 (c)(1),
(2), (4) Date: Sep. 25, 2001

(87) PCT Pub. No.: WO00/43462

PCT Pub. Date: Jul. 27, 2000

(30) Foreign Application Priority Data

Jan. 25, 1999 (JP) ............................................ 11-016328

(51) Int. Cl.$^7$ ............................................... C08L 75/00
(52) U.S. Cl. ...................................... 524/507; 525/124
(58) Field of Search ........................... 524/507; 525/124

(56) References Cited

U.S. PATENT DOCUMENTS

| 5,688,309 | A | 11/1997 | Shimada et al. |
| 6,177,531 | B1 | 1/2001 | Shimada et al. |
| 6,207,777 | B1 | 3/2001 | Shimada et al. |
| 6,251,984 | B1 | 6/2001 | Shimada et al. |
| 6,271,283 | B1 | 8/2001 | Shimada et al. |
| 6,306,944 | B1 | 10/2001 | Seki |
| 6,376,592 | B1 | 4/2002 | Shimada et al. |

FOREIGN PATENT DOCUMENTS

| JP | 50-20991 | 3/1975 |
| JP | 51-6192 | 1/1976 |
| JP | 53-134786 | 11/1978 |
| JP | 59204974 | * 11/1984 |
| JP | 4-68006 | 3/1992 |
| JP | 6-287548 | 10/1994 |
| JP | 9-125051 | 5/1997 |
| JP | 9-183962 | 7/1997 |
| JP | 9-217280 | 8/1997 |
| JP | 9-291481 | 11/1997 |
| WO | WO 97/48780 | 12/1997 |

* cited by examiner

Primary Examiner—Bernard Lipman
(74) Attorney, Agent, or Firm—Oblon, Spivak, McClelland, Maier & Neustadt, P.C.

(57) ABSTRACT

A water dispersion type water and oil repellent composition capable of imparting highly long-lasting water and oil repellency to fibers of various materials. It comprises a polymer which essentially contains polymerized units of a (meth)acrylate having a polyfluoroalkyl group and polymerized units of a polymerizable monomer which essentially contains a polymerizable unsaturated group and a hydroxyl group and in which the polymerizable unsaturated group and the hydroxyl group are connected to each other through 7 or more covalent bonds, a surfactant which contains a nonionic surfactant in an amount of from 60 to 100 wt %, an aqueous medium, and a cross-linkable compound.

17 Claims, No Drawings

WATER- AND- OIL REPELLENT COMPOSITION AND PROCESS FOR PRODUCING THE SAME

TECHNICAL FIELD

The present invention relates to a water and oil repellent composition and a process for its production. The water and oil repellent composition of the present invention is a composition which imparts excellent water and oil repellency to an object to be treated, and particularly, it is capable of imparting excellent water and oil repellency to polyamide type fibers of a pale color type such as white color. Further, the water and oil repellent composition of the present invention is capable of imparting excellent heavy rain durability to an object to be treated.

PRIOR ART

Heretofore, to impart water and oil repellency to a fiber including a polyamide type fiber or a fiber fabric, a fluorine type water and oil repellent containing a fluoropolymer having polymerized units of a (meth)acrylate having a $R^f$ group, has been employed. However, the durability of the water and oil repellency of a fiber or a fiber fabric treated with such a conventional fluorine type water and oil repellent, has been inadequate, and there has been a problem that the water and oil repellent performance decreases by e.g. washing.

To solve such a problem, (1) a fluorine type water and oil repellent having a trimethylol melamine or an organic amine incorporated (JP-A-54-133486, JP-A-56-165072, JP-A-5-272060, etc.), (2) a fluorine type water and oil repellent having a polyfunctional blocked isocyanate urethane compound incorporated (JP-A-58-208473, JP-A-2-92985, etc.), and (3) a fluorine type water and oil repellent having an aminoplast resin and a polyfunctional blocked isocyanate urethane compound incorporated, have, for example, been proposed.

The fluoropolymers in the water and oil repellents of the above (1) to (3) contain polymerized units of a polymerizable monomer having active hydrogen atoms. Specifically, they contain polymerized units of e.g. N-methylol acrylamide, 2-hydroxyethyl (meth)acrylate or 2-hydroxy-3-chloropropyl (meth)acrylate. However, the durability of the conventional water and oil repellents shown in (1) to (3) was inadequate, and particularly, there was a problem that they were poor in washing durability. Further, such a problem was distinctly observed when they were applied to polyamide type fibers or fiber fabrics.

Further, (4) a method of pretreatment with a polyhydric phenol compound, followed by treatment with a fluorine type water and oil repellent (JP-A-58-46176), and (5) a method of pretreatment with a low condensate of sulfonated phenol formaldehyde, followed by treatment with a fluorine type water and oil repellent and an aminoplast resin (JP-A-1-221576), have been proposed. However, also with the objects treated by the methods of (4) and (5), washing durability was inadequate, and there was a problem that the hand of the treated objects tended to be coarse. Further, there was a problem that when treated by the methods of (4) and (5), the treated products tended to be colored, whereby there was a problem that they could not be applied to fibers of a pale color type.

The present invention has been made to solve the above problems. The present inventors have studied the causes as to why the conventional fluorine type water and oil repellents were not able to provide adequate performance. As a result, they have found that even if the fluoropolymer which is the effective component in the water and oil repellent, contains polymerized units of a polymerizable monomer containing active hydrogen atoms, since the active hydrogen atoms are present at positions close to the polymer main chain, the $R^f$ group receives steric hindrance and can not adequately be involved in the cross-linking reaction. They considered that accordingly, the nature of the coating layer formed from the water and oil repellent tends to be inadequate, and the durability of the water and oil repellency tends to be inadequate.

Therefore, a polymer has been considered in which a group having a reactivity with a cross-linking agent is located at a position sufficiently apart from the polymer main chain so that the $R^f$ group receives no steric hindrance, in order to let the cross-linking reaction proceed effectively. Further, it has been found that washing durability can be made high without impairing the hand by selecting a hydroxyl group as the group having the reactivity with a cross-linking agent. Further, it has been found also that the object treated by means of the water and oil repellent composition containing such a polymer, has no such a difficulty as coloration.

DISCLOSURE OF THE INVENTION

The present invention provides a water and oil repellent composition comprising a polymer (A) which essentially contains the following polymerized units ($A^1$) and the following polymerized units ($A^2$), the following surfactant (B), the following aqueous medium (C) and a cross-linkable compound (D):

Polymerized units ($A^1$): polymerized units of a (meth) acrylate ($a^1$) having a $R^f$ group;

Polymerized units ($A^2$) polymerized units of a polymerizable monomer ($a^2$) which essentially contains a polymerizable unsaturated group and a hydroxyl group and in which the polymerizable unsaturated group and the hydroxyl group are connected to each other through 7 or more covalent bonds;

Surfactant (B): a surfactant containing a nonionic surfactant in an amount of from 60 to 100 wt %; and Aqueous medium (C): water only, or a medium comprising water and a water-soluble organic solvent.

Further, the present invention provides a process for producing a water and oil repellent composition, which comprises emulsifying under pressure and then polymerizing a feed material composition comprising a (meth)acrylate ($a^1$) having a $R^f$ group, a polymerizable monomer ($a^2$) which essentially contains a polymerizable unsaturated group and a hydroxyl group and in which the polymerizable unsaturated group and the hydroxyl group are connected to each other through 7 or more covalent bonds, the surfactant (B) and the aqueous medium (C), to obtain an aqueous dispersion having the polymer (A) dispersed in the aqueous medium (C), and then incorporating a cross-linkable compound (D) to the aqueous dispersion.

BEST MODE FOR CARRYING OUT THE INVENTION

In this specification, an acrylate and a methacrylate will generally be referred to as a (meth)acrylate. The same applies to the representation of a (meth)acrylamide or the like. Further, in this specification, a polyfluoroalkyl group is represented by a $R^f$ group.

A $R^f$ group is a group having two or more hydrogen atoms in an alkyl group substituted by fluorine atoms. The carbon number of the $R^f$ group is preferably from 2 to 20, particularly preferably from 6 to 16. The $R^f$ group may be of a linear structure or a branched structure, and the linear structure is particularly preferred. In the case of a branched structure, it is preferred that the branched portion is located at a terminal portion of the $R^f$ group and has a short chain of from about 1 to 4 carbon atoms.

The $R^f$ group may contain halogen atoms other than fluorine atoms. As such other halogen atoms, chlorine atoms are preferred. Further, between a carbon-carbon bond in the $R^f$ group, an etheric oxygen atom or a thioetheric sulfur atom may be inserted. The structure of the terminal portion of the $R^f$ group may, for example, be —$CF_2CF_3$, —$CF(CF_3)_2$, —$CF_2H$, —$CFH_2$ or —$CF_2Cl$, and —$CF_2CF_3$ is preferred.

The number of fluorine atoms in the $R^f$ group is preferably at least 60%, particularly preferably at least 80%, when represented by [(the number of fluorine atoms in the $R^f$ group)/(the number of hydrogen atoms contained in an alkyl group corresponding to the same carbon number as the $R^f$ group)]×100 (%).

Further, the $R^f$ group is preferably a group having all of hydrogen atoms in an alkyl group substituted by fluorine atoms (i.e. a perfluoroalkyl group) or a group having a perfluoroalkyl group at a terminal portion.

The carbon number of the perfluoroalkyl group is preferably from 2 to 20, particularly preferably from 6 to 16. If the carbon number of the perfluoro group is small, the water repellent performance and the oil repellent performance tend to decrease, and if the carbon number of the perfluoroalkyl group is large, it tends to be difficult to handle a (meth) acrylate having such a $R^f$ group.

The following groups may be mentioned as specific examples of the $R^f$ group.

$C_4F_9$— [any one of structurally isomeric groups such as $F(CF_2)_4$—, $(CF_3)_2CFCF_2$—, $(CF_3)_3C$— and $CF_3CF_2CF(CF_3)$—], $C_5F_{11}$— [such as $F(CF_2)_5$—], $C_6F_{13}$— [such as $F(CF_2)_6$—], $C_7F_{15}$— [such as $F(CF_2)_7$—], $C_8F_{17}$— [such as $F(CF_2)_8$—], $C_9F_{19}$— [such as $F(CF_2)_9$—], $C_{10}F_{21}$— [such as $F(CF_2)_{10}$—], $C_{12}F_{25}$— [such as $F(CF_2)_{12}$—], $C_{14}F_{29}$— [such as $F(CF_2)_{14}$—], $C_{16}F_{33}$— [such as $F(CF_2)_{16}$—], $Cl(CF_2)_t$—, $H(CF_2)_t$— (wherein t is an integer of from 1 to 16), $(CF_3)_2CF(CF_2)_h$— (wherein h is an integer of from 1 to 14), etc.

The following groups may be mentioned as specific examples wherein the $R^f$ group is a group having an etheric oxygen atom or a thioetheric sulfur atom inserted between a carbon-carbon bond:

$CF_3(CF_2)_4OCF(CF_3)$—, $F[CF(CF_3)CF_2O]_rCF(CF_3)CF_2CF_2$—, $F[CF(CF_3)CF_2O]_zCF(CF_3)$—, $F[CF(CF_3)CF_2O]_uCF_2CF_2$—, $F(CF_2CF_2CF_2O)_vCF_2CF_2$—, $F(CF_2CF_2O)_vCF_2CF_2$—, $CF_3(CF_2)_4SCF(CF_3)$—, $F[CF(CF_3)CF_2S]_rCF(CF_3)CF_2CF_2$—, $F[CF(CF_3)CF_2S]_rCF(CF_3)$—, $F[CF(CF_3)CF_2S]_uCF_2CF_2$—, $F(CF_2CF_2CF_2S)_vCF_2CF_2$—, $F(CF_2CF_2S)_vCF_2CF_2$— (wherein r is an integer of from 1 to 10, u is an integer of from 2 to 6, and v is an integer of from 1 to 11), etc.

The water and oil repellent composition of the present invention comprises the polymer (A), the surfactant (B), the aqueous medium (C) and the cross-linkable compound (D), as essential components. The polymer (A) is a polymer which essentially contains polymerized units ($A^1$) of a (meth)acrylate ($a^1$) having a $R^f$ group, and polymerized units ($A^2$) of a polymerizable monomer ($a^2$) which essentially contains a polymerizable unsaturated group and a hydroxyl group and in which the polymerizable unsaturated group and the hydroxyl group are connected to each other through 7 or more covalent bonds.

The polymerized units ($A^1$ are polymerized units of a (meth)acrylate ($a^1$) having a $R^f$ group, and the (meth) acrylate ($a^1$) having a $R^f$ group is a group wherein the $R^f$ group is located at the alcohol residue portion of the (meth) acrylate.

As the (meth)acrylate ($a^1$) having a $R^f$ group, a compound of the following Formula 1 is preferred, provided that in the Formula 1, $R^f$ represents a $R^f$ group, Q is a bivalent organic group, and R is a hydrogen atom or a methyl group.

$R^f$—Q—OCOCR=$CH_2$             Formula 1

$R^f$ in the formula is preferably a $R^f$ group containing no etheric oxygen atom or no thioetheric sulfur atom, particularly preferably a perfluoroalkyl group, especially preferably a perfluoroalkyl group having a linear structure. As the perfluoroalkyl group having a linear structure, a group represented by —$F(CF_2)_w$— (wherein w is an integer of from 1 to 16, preferably an integer of from 4 to 16, particularly preferably an integer of from 6 to 12), is preferred.

Q in the Formula 1 is preferably —$(CH_2)_{e+q}$—, —$(CH_2)_e CONR^a(CH_2)_q$—, —$(CH_2)_c OCONR^a(CH_2)_q$—, —$(CH_2)_c SO_2NR^a(CH_2)_q$—, —$(CH_2)_e NHCONH(CH_2)_q$—, —$(CH_2)_e CH(OH)(CH_2)_q$—, etc., wherein $R^a$ is a hydrogen atom or an alkyl group, and each of e and q which are independent of each other, is an integer of at least 0, and e+q is an integer of from 1 to 22.

Further, Q in the Formula 1 is preferably —$(CH_2)_{e+q}$—, —$(CH_2)_e CONR^a(CH_2)_q$— or —$(CH_2)_e SO_2NR^a(CH_2)_q$—, wherein q is an integer of 2 or more, and e+q is from 2 to 6, particularly preferably —$(CH_2)_{e+q}$— wherein e+q is from 2 to 6 (i.e. an ethylene group to a hexamethylene group). Further, it is preferred that fluorine atoms are bonded to the carbon atom of $R^f$ which is bonded to Q in the Formula 1.

The following compounds may be mentioned as the (meth)acrylate ($a^1$) having a $R^f$ group, provided that R in the following compounds is a hydrogen atom or a methyl group.

$F(CF_2)_5CH_2OCOCR=CH_2$,
$F(CF_2)_6CH_2CH_2OCOCR=CH_2$,
$H(CF_2)_6CH_2OCOCR=CH_2$,
$H(CF_2)_8CH_2OCOCR=CH_2$,
$H(CF_2)_{10}CH_2OCOCR=CH_2$,
$H(CF_2)_8CH_2CH_2OCOCR=CH_2$,
$F(CF_2)_8CH_2CH_2CH_2OCOCR=CH_2$,
$F(CF_2)_8(CH_2)_4OCOCR=CH_2$,
$F(CF_2)_{10}CH_2CH_2OCOCR=CH_2$,
$F(CF_2)_{12}CH_2CH_2OCOCR=CH_2$,
$F(CF_2)_{14}CH_2CH_2OCOCR=CH_2$,
$F(CF_2)_{16}CH_2CH_2OCOCR=CH_2$,
$(CF_3)_2CF(CF_2)_4CH_2CH_2OCOCR=CH_2$,
$(CF_3)_2CF(CF_2)_6CH_2CH_2OCOCR=CH_2$,
$(CF_3)_2CF(CF_2)_8CH_2CH_2OCOCR=CH_2$,
$F(CF_2)_8SO_2N(CH_3)CH_2CH_2OCOCR=CH_2$,
$F(CF_2)_8SO_2N(C_2H_5)CH_2CH_2OCOCR=CH_2$,
$F(CF_2)_8SO_2N(C_3H_7)CH_2CH_2OCOCR=CH_2$,
$F(CF_2)_8CONHCH_2CH_2OCOCR=CH_2$,
$(CF_3)_2CF(CF_2)_5(CH_2)_3OCOCR=CH_2$,
$(CF_3)_2CF(CF_2)_5CH_2CH(OCOCH_3)OCOCR=CH_2$,
$(CF_3)_2CF(CF_2)_5CH_2CH(OH)CH_2OCOCR=CH_2$,
$(CF_3)_2CF(CF_2)_7CH_2CH(OH)CH_2OCOCR=CH_2$,
$F(CF_2)_9CH_2CH_2OCOCR=CH_2$,
$F(CF_2)_9CONHCH_2CH_2OCOCR=CH_2$.

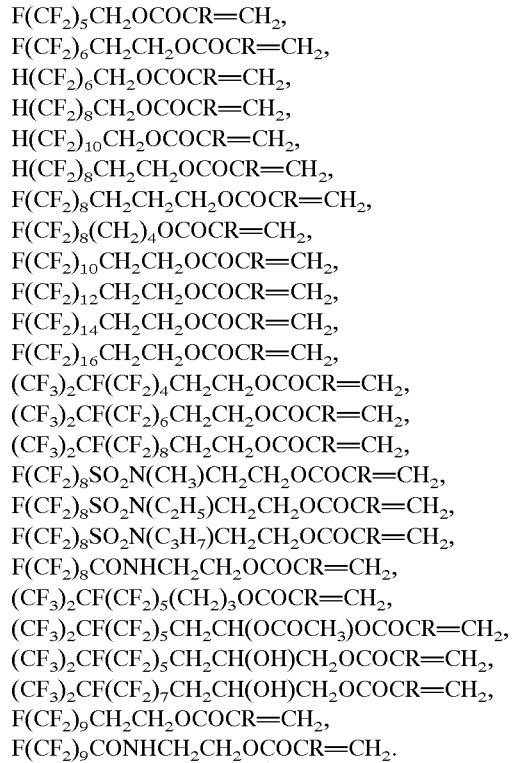

The polymerized units ($A^1$ may be composed of one type or two or more types. When the polymerized units ($A^1$ are composed of two or more units, they are preferably polymer units wherein the carbon numbers of the $R^f$ group portions are different.

The polymerized units ($A^2$) are polymerized units of a polymerizable monomer ($a^2$) which essentially contains a polymerizable unsaturated group and a hydroxyl group and in which the polymerizable unsaturated group and the hydroxyl group are connected to each other through 7 or more covalent bonds. As the polymerizable unsaturated group in the polymerizable monomer ($a^2$), $CH_2=CH-$ or $CH_2=C(CH_3)-$ is preferred. Further, the number of the polymerizable unsaturated groups in the polymerizable monomer ($a^2$) is preferably 1 or 2, particularly preferably 1. Further, the number of hydroxyl groups in the polymerizable monomer ($a^2$) is preferably 1.

The polymerizable unsaturated group and the hydroxyl group in the polymerizable monomer ($a^2$) are connected to each other through 7 or more covalent bonds. Namely, between the polymerizable unsaturated group and the hydroxyl group, a bivalent connecting group is present, and in such a bivalent connecting group, a chain of bivalent or higher valent atoms capable of forming covalent bonds is present linearly in a number of 6 or more atoms. In a case where polymerizable unsaturated groups and hydroxyl groups are present in a number of 2 or more, respectively, in the polymerizable monomer ($a^2$), the smallest among the numbers of the covalent bonds present between the respective hydroxyl groups and the respective polymerizable unsaturated groups, is 7 or more.

The polymerizable monomer ($a^2$) is preferably a polymerizable monomer having one polymerizable unsaturated group and one hydroxyl group, in which the number of covalent bonds between the polymerizable unsaturated group and the hydroxyl group is 7 or more, particularly preferably 11 or more, especially preferably 13 or more. Further, the number of the covalent bonds is preferably at most 70. Further, the lower limit in the number of the covalent bonds is preferably at least the chain length number of the $R^f$ group in the (meth)acrylate ($a^1$) having the $R^f$ group, particularly preferably at least the chain length number +3.

The polymerizable monomer ($a^2$) is preferably selected from known or well-known polymerizable monomers. A polymerizable monomer represented by the following Formula 2, 3 or 4 is preferred, and the polymerizable monomer represented by the Formula 2 is particularly preferred from the viewpoint of the performance of the water and oil repellent composition obtained.

$CH_2=CR^1COOCHR^2CHR^3O[CO(CH_2)_nO]_mH$    Formula 2

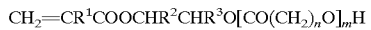

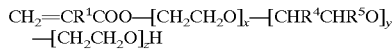

provided that the symbols in the formulae 2 to 4 have the following meanings:

$R^1, R^2, R^3, R^4, R^5, R^6, R^7, R^8, R^9$: each independently, a hydrogen atom or a methyl group;

n: an integer of from 2 to 6;

m: an integer of from 1 to 20;

x, y, Z: each independently, an integer of from 0 to 30, provided that x+y+z is an integer of 2 or more;

a, b, d: each independently, an integer of from 0 to 30, provided that a+b+d is an integer of 2 or more; and p: an integer of from 3 to 6.

The following compounds may be mentioned as specific examples of the polymerizable monomer represented by the Formula 2:

$CH_2=CHCOOCH_2CH_2O\{CO(CH_2)_5O\}_2H$,
$CH_2=CHCOOCH_2CH_2O\{CO(CH_2)_5O\}_4H$,
$CH_2=CHCOOCH_2CH_2O\{CO(CH_2)_5O\}_5H$,
$CH_2=CHCOOCH_2CH_2O\{CO(CH_2)_5O\}_{10}H$,
$CH_2=C(CH_3)COOCH_2CH_2O\{CO(CH_2)_5O\}_2H$,
$CH_2=C(CH_3)COOCH_2CH_2O\{CO(CH_2)_5O\}_4H$,
$CH_2=C(CH_3)COOCH_2CH_2O\{CO(CH_2)_5O\}_5H$,
$CH_2=C(CH_3)COOCH_2CH_2O\{CO(CH_2)_5O\}_{10}H$.

The following compounds may be mentioned as specific examples of the polymerizable monomer represented by the Formula 3:

$CH_2=C(CH_3)COO(CH_2CH_2O)_4H$,
$CH_2=C(CH_3)COO(CH_2CH_2O)_9H$,
$C_2H=C(CH_3)COO(CH_2CH_2O)_{23}H$,
$CH_2=C(CH_3)COO(CH_2CH_2O)_{23}H$,
$CH_2=C(CH_3)COO\{CH_2CH(CH_3)O\}_5H$,
$CH_2=C(CH_3)COO\{CH_2CH(CH_3)O\}_9H$,
$CH_2=C(CH_3)COO(CH_2CH_2O)_7\{CH_2CH(CH_3)O\}_3H$,
$CH_2=CHCOO(CH_2CH_2O)_4H$,
$CH_2=C(CH_3)COO\{CH_2CH(CH_3)O\}_5(CH_2CH_2O)_5H$.

The following compounds may be mentioned as specific examples of the polymerizable monomer represented by the Formula 4:

$CH_2=C(CH_3)COO(CH_2CH_2O)_{10}(CH_2CH_2CH_2CH_2O)_5H$, $CH_2 \quad C(CH_3)COO\{CH_2CH(CH_3)O\}_7(CH_2CH_2CH_2CH_2O)_6H$, $CH_2=C(CH_3)COO(CH_2CH_2CH_2CH_2O)_4(CH_2CH_2O)_6H$, $CH_2=C(CH_3)COO(CH_2CH_2CH_2CH_2O)_4\{CH_2CH(CH_3)O\}_4H$.

Further, the polymer (A) is preferably a polymer comprising polymerized units ($A^1$), polymerized units ($A^2$) and the following polymerized units ($A^3$):

Polymerized units ($A^3$): polymerized units of an alkyl (meth)acrylate wherein the carbon number of the alkyl group is from 1 to 22, and/or polymerized units of a cycloalkyl (meth)acrylate wherein the carbon number of the cycloalkyl group is from 5 to 8.

Namely, the polymer (A) is preferably one of the following polymers ($X^1$) to ($X^3$):

Polymer ($X^1$): a polymer comprising polymerized units ($A^1$), polymerized units ($A^2$) and polymerized units of an alkyl (meth)acrylate wherein the carbon number of the alkyl group is from 1 to 22.

Polymer ($X^2$): a polymer comprising polymerized units ($A^1$, polymerized units ($A^2$) and polymerized units of a cycloalkyl (meth) acrylate wherein the carbon number of the cycloalkyl group is from 5 to 8.

Polymer ($X^3$): a polymer comprising polymerized units ($A^1$, polymerized units ($A^2$), polymerized units of an alkyl (meth)acrylate wherein the carbon number of the alkyl group is from 1 to 22 and polymerized units of a cycloalkyl (meth)acrylate wherein the carbon number of the cycloalkyl group is from 5 to 8.

Here, the alkyl (meth)acrylate wherein the carbon number of the alkyl group is from 1 to 22, is preferably 2-ethylhexyl (meth)acrylate, dodecyl (meth)acrylate, octadecyl (meth) acrylate or dococyl (meth)acrylate.

Further, the cycloalkyl (meth)acrylate wherein the carbon number of the cycloalkyl group is from 5 to 8, is preferably cyclohexyl (meth)acrylate.

Further, the polymer (A) of the present invention is preferably a polymer containing the following polymerized units ($A^4$).

Polymerized units ($A^4$): polymerized units of a vinyl halide or polymerized units of a vinylidene halide.

The halogen atom in the vinyl halide or the vinylidene halide is preferably a fluorine atom or a chlorine atom. The vinyl halide is preferably vinyl chloride, vinyl fluoride or chlorotrifluoroethylene, particularly preferably vinyl chloride. The vinylidene halide is preferably vinylidene chloride or vinylidene fluoride. The polymerized units ($A^4$) are preferably polymerized units of vinyl chloride or polymerized units of vinyl fluoride, particularly preferably polymerized units of vinyl chloride.

Further, the polymer (A) of the present invention may further contain polymerized units other than the above polymerized units ($A^1$) to ($A^4$) (hereinafter referred to as other polymerized units ($A^5$)) depending upon the desired performance or application.

Such other polymerized units ($A^5$) are polymerized units of other polymerizable monomer ($a^5$). As such other polymerizable monomer ($a^5$), a polymerizable monomer having one or two polymerizable unsaturated groups, is preferred, and particularly preferred is a polymerizable monomer having one polymerizable unsaturated group.

The following compounds are preferred as the polymerizable monomer ($a^5$).

An olefin such as ethylene, propylene, butadiene, isoprene, vinyl chloride, vinyl fluoride, vinylidene chloride, vinylidene fluoride or chloroprene, a styrene such as styrene, a-methylstyrene or 4-methylstyrene, a (meth)acrylamide such as diacetone (meth)acrylamide, N,N-dimethyl (meth)acrylamide or N-methylol (meth)acrylamide, an ether such as ethyl vinyl ether, cyclohexyl vinyl ether or allyl glycidyl ether, a vinyl carboxylate such as vinyl acetate, and an alkyl vinyl ketone such as ethyl vinyl ketone.

A (meth)acrylate such as glycidyl (meth)acrylate, benzyl (meth)acrylate, 2-hydroxyethyl (meth)acrylate, 2-hydroxy-3-chloropropyl (meth)acrylate, polyoxyalkylene mono (meth)acrylate monomethyl ether, polyoxyalkylene di(meth)acrylate, 2-(dimethylamino)ethyl (meth)acrylate, or a (meth)acrylate having a polydimethylsiloxane group, triallyl cyanurate, N-vinyl carbazole, N-alkyl maleimide, maleic anhydride, maleic acid monoalkyl ester, maleic acid dialkyl ester, etc.

Here, the blocked isocyanate group-containing (meth)acrylate in the polymerizable monomer ($a^5$) is preferably a (meth)acrylate having one or more blocked isocyanate groups. Preferred is a compound of the structure wherein the isocyanate group of the isocyanate group-containing (meth)acrylate is blocked with a blocking agent.

Here, the isocyanate group-containing (meth)acrylate is preferably 2-isocyanate ethyl (meth)acrylate, or a reaction product obtained by reacting a (meth)acrylate having a functional group capable of bonding with an isocyanate group, with a polyisocyanate in such a ratio that one or more isocyanate groups will remain. The (meth)acrylate having a functional group capable of bonding with the isocyanate group is preferably a (meth)acrylate having a hydroxyl group, particularly preferably a mono or diester of (meth) acrylic acid with a polyhydric alcohol. The polyhydric alcohol may, for example, be ethylene glycol, polyoxyethylene glycol, propylene glycol, polyoxypropylene glycol, glycerol, a trimethylol propane/alkylene oxide adduct or pentaerythritol.

Further, the polyisocyanate is preferably an aliphatic polyisocyanate, for example, an aliphatic isocyanate such as hexamethylene diisocyanate, isophorone diisocyanate, 4,4'-dicyclohexylmethane diisocyanate, cyclohexylene diisocyanate or norbornene diisocyanate, a modified product such as an isocyanurate modified product, a prepolymer modified product or a buret modified product, of such an aliphatic isocyanate, or a dimer or trimer of such an aliphatic isocyanate, particularly preferably an aliphatic isocyanate, and an isocyanurate modified product, a prepolymer modified product or a buret modified product thereof.

The blocking agent is preferably an alkyl ketoxime, a phenol, an alcohol, a β-diketone, a lactam or an amine, particularly preferably methyl ethyl ketoxime, ε-caprolactam, phenol, cresol, acetylacetone, diethyl malonate, isopropyl alcohol, t-butyl alcohol or maleimide, particularly preferably an alkyl ketoxime such as methyl ethyl ketoxime or a lactam such as ε-caprolactam, especially preferred is a blocking agent composed of a compound having a dissociation temperature of from 120 to 180° C.

The following compounds may be mentioned as specific examples of the blocked isocyanate group-containing (meth) acrylate:

A compound wherein the isocyanate group of 2-isocyanate ethyl (meth)acrylate is blocked with methyl ethyl ketoxime, A compound in which the isocyanate group of 2-isocyanate ethyl (meth)acrylate is blocked with ε-caprolactam, A compound wherein the isocyanate group in the 1:1 (molar ratio) reaction product of isophorone diisocyanate with 2-hydroxyethyl (meth)acrylate, is blocked with methyl ethyl ketoxime.

A compound wherein in the 1:1 (molar ratio) reaction product of isophorone diisocyanate with 2-hydroxypropyl (meth)acrylate, is blocked with methyl ethyl ketoxime.

A compound wherein the isocyanate group in the 1:1 (molar ratio) reaction product of norbornene isocyanate with 2-hydroxyl ethyl (meth)acrylate, is blocked with methyl ethyl ketoxime.

The polymer (A) in the present invention is preferably a polymer which essentially contains polymerized units ($A^1$) and polymerized units ($A^2$) and which further contains polymerized units other than such polymerized units.

As the polymerized units other than such polymerized units are preferably polymerized units ($A^3$) and/or polymerized units ($A^4$). Further, in a case where the polymer (A) contains polymerized units ($A^3$) and/or polymerized units ($A^4$), it is preferred that it further contains polymerized units ($A^5$) based on a polymerizable monomer which is solid or liquid under the emulsifying condition under pressure, among polymerized units ($A^5$).

The proportions of the respective polymerized units in the polymer (A) are preferably such that the proportion of polymerized units ($A^1$) is from 20 to 99 wt %, and the proportion of polymerized units ($A^2$) is preferably from 1 to 80 wt %, particularly preferably from 1 to 50 wt %. In a case where the polymer (A) is a polymer containing polymerized units ($A^3$), the content is preferably from 1 to 60 wt % in the polymer (A), and in a case where it contains polymerized units ($A^4$), the content is preferably from 1 to 25 wt % in the polymer (A). In a case where the polymer (A) contains polymerized units ($A^5$), the content is preferably from 1 to 50 wt % in the polymer (A).

The water and oil repellent composition of the present invention contains the surfactant (B) as an essential component. The surfactant (B) is a surfactant containing a nonionic surfactant in an amount of from 60 to 100 wt %. The surfactant (B) may be composed of one type or two or more types. Further, the surfactant (B) may be composed solely of nonionic surfactants or may contain, together with a nonionic surfactant, a surfactant other than the nonionic surfactant. As the surfactant other than the nonionic surfactant, a cationic surfactant or an amphoteric surfactant is preferred. Further, it is preferred that the surfactant (B) to be incorporated to the water and oil repellent composition of the present invention, does not contain a surfactant containing a fluorine atom, from the viewpoint of e.g. the stability of the liquid after the pressure emulsification which will be described hereinafter, or the performance during the fiber treatment.

The nonionic surfactant in the surfactant (B) is preferably at least one nonionic surfactant selected from the following surfactants ($b^1$) to ($b^6$), particularly preferably at least one member selected from the surfactant ($b^1$), ($b^2$), ($b^3$), ($b^4$) and ($b^6$), from the viewpoint of the water and oil repellent performance and little influence over the environment.

The surfactant ($b^1$) is a nonionic surfactant made of a polyoxyalkylene monoalkyl ether, a polyoxyalkylene monoalkenyl ether or a polyoxyalkylene monoalkpolyenyl ether.

The alkyl group, the alkenyl group or the alkpolyenyl group in the surfactant ($b^1$) is preferably one having a carbon number of from 4 to 26. Further, the alkyl group, the alkenyl group or the alkpolyenyl group may be of a linear structure or a branched structure. In the case of the branched structure, a secondary alkyl group, a secondary alkenyl group or a secondary alkpolyenyl group is preferred. Specific examples of the alkyl group, the alkenyl group or the alkpolyenyl group may, for example, be an octyl group, a dodecyl group, a tetradecyl group, a hexadecyl group, an octadecyl group, a hexadecyl group, a behenyl group (dococyl group) and an oleyl group (9-octadecenyl group).

The surfactant ($b^1$) is preferably a polyoxyalkylene monoalkyl ether or a polyoxyalkylene monoalkenyl ether.

The polyoxyalkylene moiety of the surfactant ($b^1$) is preferably made of one or two types of oxyalkylene groups, and when it is made of two types, their chain is preferably in the form of block. The polyoxyalkylene moiety is preferably made of a moiety wherein two or more oxyethylene groups and/or oxypropylene groups are connected.

The surfactant ($b^1$) is preferably a compound represented by the following Formula 5. In the following Formula 5, $R^2$ represents an alkyl group having a carbon number of 8 or more or an alkenyl group having a carbon number of 8 or more, s represents an integer of from 5 to 50, and g represents an integer of from 0 to 20. Further, in a case where g and s are 2 or more, the oxyethylene groups and the oxypropylene groups in the Formula 5 are connected in a block form.

$$R^{10}O[CH_2CH(CH_3)O]_g\text{—}(CH_2CH_2O)_sH \quad \text{Formula 5}$$

In the Formula 5, $R^{10}$ may be of a linear structure or a branched structure. s is preferably an integer of from 10 to 30, and g is preferably an integer of from 0 to 10. When s is 4 or less, or if g is 21 or more, it tends to be hardly soluble in water and will not be uniformly dissolved in an aqueous medium (C), whereby the effect for improving the penetration property tends to decrease. Further, if s is 51 or more, the hydrophilicity tends to be high, whereby the water repellency tends to be low.

The following compounds may be mentioned as specific examples of the compound (Formula 5). In the following formulae, s and g have the same meanings as mentioned above, and the preferred embodiments are also the same. Further, the oxyethylene groups and the oxypropylene groups are connected in a block form.

$C_{18}H_{37}O[CH_2CH(CH_3)O]_g\text{—}(CH_2CH_2O)_5H$,
$C_{18}H_{35}O[CH_2CH(CH_3)O]_g\text{—}(CH_2CH_2O)_5H$,
$C_{16}H_{33}O[CH_2CH(CH_3)O]_g\text{—}(CH_2CH_2O)_5H$,
$C_{12}H_{25}O[CH_2CH(CH_3)O]_g\text{—}(CH_2CH_2O)_5H$,
$(C_8H_{17})(C_6H_{13})CHO[CH_2CH(CH_3)O]_g\text{—}(CH_2CH_2O)_5H$,
$C_{10}H_{21}O[CH_2CH(CH_3)O]_g\text{—}(CH_2CH_2O)_5H$.

The surfactant ($b^2$) is a nonionic surfactant made of a compound which has at least one carbon-carbon triple bond and at least one hydroxyl group in its molecule and which exhibits a surface activity.

The surfactant ($b^2$) is preferably a nonionic surfactant made of a compound which has one carbon-carbon triple bond and one or two hydroxyl groups in its molecule. Further, such a nonionic surfactant may have a polyoxyalkylene moiety as a partial structure. The polyoxyalkylene moiety may, for example, be a polyoxyethylene moiety, a polyoxypropylene moiety, a moiety wherein an oxyethylene group and an oxypropylene group are connected randomly or a moiety wherein a polyoxyethylene and a polyoxypropylene are connected in a block form.

As a specific example of the surfactant ($b^2$), a compound represented by the following Formula 6, 7, 8 or 9 is preferred.

$$HO\text{—}CR^{11}R^{12}\text{—}C{\equiv}C\text{—}CR^{13}R^{14}\text{—}OH \quad \text{Formula 6}$$
$$HO\text{—}(A^1O)_i\text{—}CR^{11}R^{12}\text{—}C{\equiv}C\text{—}CR^{13}R^{14}\text{—}(OA^2)_j\text{—}OH \quad \text{Formula 7}$$
$$HO\text{—}CR^{15}R^{16}\text{—}C{\equiv}C\text{—}H \quad \text{Formula 8}$$
$$HO\text{—}(A^3O)_k\text{—}CR^{15}R^{16}\text{—}C{\equiv}C\text{—}H \quad \text{Formula 9}$$

In the Formulae 6 to 9, each of $A^1$, $A^2$ and $A^3$ which are independent of one another, is an alkylene group, each of i and j is an integer of 0 or more, and (i+j) is an integer of 1 or more. k is an integer of 1 or more. In a case where i, j or k is 2 or more, respectively, each of $A^1$, $A^2$ and $A^3$ may be composed of one type of alkylene groups or may be composed of two or more types of alkylene groups.

Each of $R^{11}$ to $R^{16}$ which are independent of one another, is a hydrogen atom or an alkyl group. The alkyl group is preferably a $C_{1-12}$ alkyl group, particularly preferably a $C_{6-12}$ alkyl group. Specific examples of such a group include a methyl group, an ethyl group, a propyl group, a butyl group or an isobutyl group.

Further, the oxyalkylene moiety is preferably made of an oxyethylene moiety, an oxypropylene moiety, or both of the oxyethylene moiety and the oxypropylene moiety. The number of oxyalkylene groups in the surfactant (b2) is preferably from 1 to 50.

Further, as the surfactant ($b^2$), a nonionic surfactant represented by the following Formula 10 is preferred. In the Formula 10, each of α and β is an integer of 0 or more. The nonionic surfactant (Formula 10) may be used as composed of one type only or as composed of two or more types in combination.

Formula 10

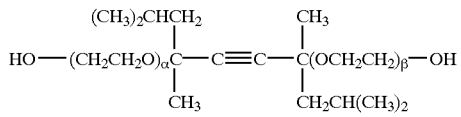

The nonionic surfactant (Formula 10) is preferably a nonionic surfactant wherein the average of the sum of α and β is 10, a nonionic surfactant wherein α is 0, and β is 0, or a nonionic surfactant wherein the average of the sum of α and β is 1.3.

The surfactant (b³) is a nonionic surfactant made of a compound in which a polyoxyethylene moiety having two or more oxyethylenes chained and a moiety having two or more oxyalkylenes having a carbon number of 3 or more chained, are connected, and both terminals are hydroxyl groups. The oxyalkylene having a carbon number of 3 or more in the surfactant (b³) is preferably oxytetramethylene and/or oxypropylene.

As the surfactant (b³), a nonionic surfactant made of a compound represented by the following Formula 11 or 12, is preferred. In the Formulae 11 and 12, φ is an integer of from 0 to 200, δ is an integer of from 2 to 100, and η is an integer of from 0 to 200. When φ is 0, tη is an integer of 2 or more, and when η is 0, φ is an integer of 2 or more. Further, the —$C_3H_6$— moiety in the Formula 11, may be —$CH(CH_3)CH_2$— or —$CH_2CH(CH_3)$—, or a mixture of —$CH(CH_3)CH_2$— and —$CH_2CH(CH_3)$—. Further, the polyoxyalkylene moiety in the following formula is chained in a block form.

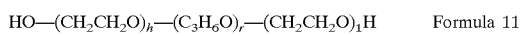

HO—$(CH_2CH_2O)_h$—$(C_3H_6O)_r$—$(CH_2CH_2O)_lH$   Formula 11

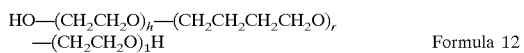

HO—$(CH_2CH_2O)_h$—$(CH_2CH_2CH_2CH_2O)_r$
—$(CH_2CH_2O)_lH$   Formula 12

Further, as the surfactant (b³), a nonionic surfactant made of any one of the following compounds, is preferred.

HO—$(CH_2CH_2O)_{15}$—$(C_3H_6O)_{35}$—$(CH_2CH_2O)_{15}H$,
HO—$(CH_2CH_2O)_8$—$(C_3H_6O)_{35}$—$(CH_2CH_2O)_8H$,
HO—$(CH_2CH_2O)_{45}$—$(C_3H_6O)_{17}$—$(CH_2CH_2O)_{45}H$,
HO—$(CH_2CH_2O)_{34}$—$(CH_2CH_2CH_2CH_2O)_{28}$—$(CH_2CH_2O)_{34}H$.

The surfactant (b⁴) is a nonionic surfactant having an amine oxide moiety in its molecule, and is preferably a nonionic surfactant made of a compound represented by the following Formula 13:

$(R^{17})(R^{18})(R^{19})N(\rightarrow O)$   Formula 13

In the Formula 13, each of $R^{17}$ $R^{18}$ and $R^{19}$ which are independent of one another, is a monovalent hydrocarbon group. The surfactant having an amine oxide moiety (N→O) in its molecule may sometimes be classified into a cationic surfactant. However, in the present invention, it will be regarded as a nonionic surfactant. Such a surfactant may be composed of one type or two or more types.

As the surfactant (b⁴), a nonionic surfactant represented by the following Formula 14 is particularly preferred, since it improves the dispersion stability of the polymer (A).

$(R^{20})(CH_3)_2N(\rightarrow O)$   Formula 14

In the Formula 14, $R^{20}$ represents a $C_{6-22}$ alkyl group, a $C_{6-22}$ alkenyl group, a phenyl group to which an alkyl group (having a carbon number of from 6 to 22) bonded, or a phenyl group having an alkenyl group (having a carbon number of from 6 to 22) bonded, preferably a C8-22 alkyl group or a $C_{8-22}$ alkenyl group.

The following compounds may be mentioned as specific examples of the nonionic surfactant (Formula 14):

$(CH_2)_{12}](CH_3)_2N(\rightarrow O)$,
$[H(CH_2)_{14}](CH_3)_2N(\rightarrow O)$,
$[H(CH_2)_{16}](CH_3)_2N(\rightarrow O)$,
$[H(CH_2)_{18}](CH_3)_2N(\rightarrow O)$.

The surfactant (b⁵) is a nonionic surfactant made of a condensate of a polyoxyethylene mono(substituted phenyl) ether, or a polyoxyethylene mono(substituted phenyl)ether. The substituted phenyl group in the surfactant (b⁵) is preferably a phenyl group substituted by a monovalent hydrocarbon group, more preferably a phenyl group substituted by an alkyl group, an alkenyl group or a styryl group.

The surfactant (b⁵) is preferably a condensate of a polyoxyethylene mono(alkylphenyl)ether, a condensate of a polyoxyethylene mono(alkenylphenyl)ether, a polyoxyethylene mono(alkylphenyl)ether, a polyoxyethylene mono (alkenylphenyl)ether, or a polyoxyethylene mono[(alkyl)(styryl)phenyl]ether.

As a specific example of the condensate of a polyoxyethylene mono(substituted phenyl)ether or the polyoxyethylene mono(substituted phenyl)ether, a formaldehyde condensate of polyoxyethylene mono(nonylphenyl)ether, polyoxyethylene mono(nonylphenyl)ether, polyoxyethylene mono (octylphenyl)ether, polyoxyethylene mono (oleylphenyl) ether, polyoxyethylene mono[(nonyl)(styryl)phenyl]ether, or polyoxyethylene mono[(oleyl)(styryl)phenyl]ether, may, for example, be mentioned.

The surfactant (b⁶) is a nonionic surfactant made of a fatty acid ester of a polyol. The polyol in the surfactant (b⁶) may, for example, be polyethylene glycol, decaglycerol, or an ether of polyethylene glycol with a polyol (other than polyethylene glycol).

The surfactant (b⁶) may, for example, be a 1:1 (molar ratio) ester of octadecanoic acid and polyethylene glycol, a 1:4 (molar ratio) ester of an ether of sorbit with polyethylene glycol, and oleic acid, a 1:1 (molar ratio) ester of an ether of an polyoxyethylene glycol with sorbitan, and octadecanoic acid, a 1:1 (molar ratio) ester of an ether of polyethylene glycol with sorbitan, and oleic acid, a 1:1 (molar ratio) ester of dodecanoic acid and sorbitan, a (1 or 2):1 (molar ratio) ester of oleic acid and decaglycerol, or a (1 or 2):1 (molar ratio) ester of octadecanoic acid and decaglycerol.

In a case where the surfactant (B) contains a cationic surfactant, it is preferred to employ a cationic surfactant made of a substituted ammonium salt. As the cationic surfactant made of a substituted ammonium salt, preferred is a cationic surfactant made of a compound wherein at least one hydrogen atom bonded to the nitrogen atom of the ammonium salt is substituted by an alkyl group, an alkenyl group or a polyoxyalkylene group having a terminal hydroxyl group. Particularly preferred is a cationic surfactant made of a compound represented by the following Formula 15:

$[(R^{21})_4N^+]\cdot X^-$   Formula 15

In the Formula 15, the symbols have the following meanings:

$R^{21}$: each of or $R^{21}$ which are independent of one another, is a hydrogen atom, a $C_{1-22}$ alkyl group, a $C_{2-22}$ alkenyl group, or a polyoxyalkylene group having a terminal hydroxyl group, provided that all $R^{21}$ are not simultaneously hydrogen atoms.

X⁻: a counter ion.

When $R^{21}$ is an alkyl group, it is preferably a long chain alkyl group having a carbon number of from 6 to 22. When $R^{21}$ is an alkyl group other than the long chain alkyl group, it is preferably a methyl group or an ethyl group. When $R^{21}$ is an alkenyl group, it is preferably a long chain alkenyl group having a carbon number of from 6 to 22. Further, when $R^{21}$ is a polyoxyalkylene group, it is preferably a polyoxyethylene group. X⁻ is preferably a chlorine ion, an ethyl sulfate ion or an acetate ion.

The compound (Formula 15) may, for example, be a mono(long chain alkyl)amine hydrochloride, a mono(long chain alkyl)dimethylamine hydrochloride, a mono(long chain alkyl)dimethylamine acetate, a mono(long chain alkenyl)dimethylamine hydrochloride, a mono(long chain alkyl)dimethylamine ethyl sulfate, a mono(long chain alkyl) trimethylammonium chloride, a di(long chain alkyl) monomethylamine hydrochloride, a di(long chain alkyl) dimethylammonium chloride, a mono(long chain alkyl) monomethyl di(polyoxyethylene)ammonium chloride, or a di(long chain alkyl)monomethylmono(polyoxyethylene) ammonium chloride.

Further, the compound (Formula 15) may, for example, preferably be monooctadecyltrimethylammonium chloride, monooctadecyldimethylmonoethylammonium ethyl sulfate, a mono(long chain alkyl)monomethyldi (polyethyleneglycol)ammonium chloride, a di(beef tallow alkyl)dimethylammonium chloride or dimethylmonococonutamine acetate.

When the surfactant (B) contains an amphoteric surfactant, it is preferably an amphoteric surfactant made of an alanine, an imidazolinium betaine, an amide betaine or a betaine acetate. Specific examples of the amphoteric surfactant include, for example, dodecyl betaine, octadecyl betaine, dodecylcarboxymethylhydroxyethyl imidazolinium betaine, dodecyldimethylamino betaine acetate, and a fatty acid amidepropyldimethylamino betaine acetate.

The amount of the surfactant (B) is preferably from 1 to 10 wt %, particularly preferably from 3 to 10 wt %, based on the polymer (A). If the amount of the surfactant (B) is too small, the stability of the emulsion of the water and oil repellent composition is likely to decrease, and if it is too much, the water and oil repellent performance, particularly the wet abrasion durability, is likely to decrease. However, in a case where the polymerized units present in the polymer (A) are polymerized units of a polymerizable monomer having a self emulsifying property, the amount of the surfactant (B) may be reduced.

The water and oil repellent composition of the present invention contains an aqueous medium (C) as an essential component. The aqueous medium (C) is a medium composed solely of water, or water and a water-soluble organic solvent.

The water-soluble organic solvent in the aqueous medium (C) is preferably at least one member selected from acetone, isopropyl alcohol, a saturated polyhydric alcohol, a (mono or poly) alkyl ether or a saturated polyhydric alcohol, or an alkylene oxide adduct of a saturated polyhydric alcohol.

The saturated polyhydric alcohol is preferably a compound having from 2 to 4 hydroxyl groups, particularly preferably ethylene glycol, propylene glycol, glycerol, trimethylol ethane or trimethylol propane.

The (mono or poly) alkyl ether of a saturated polyhydric alcohol, is preferably a monoalkyl ether of a diol or a dialkyl ether of a diol. For example, it is preferably diethylene glycol monomethyl ether, dipropylene glycol monomethyl ether, or dipropylene glycol dimethyl ether, particularly preferably diethylene glycol monomethyl ether or dipropylene glycol monomethyl ether.

The reaction product of a saturated polyhydric alcohol with ethylene oxide and/or propylene oxide, is preferably dipropylene glycol, tripropylene glycol, tetrapropylene glycol or a polypropylene glycol wherein 5 or more oxypropylene groups are chained.

The solvent in the aqueous medium (C) is preferably at least one solvent selected from ethylene glycol, propylene glycol, diethylene glycol, triethylene glycol, tetraethylene glycol, diethylene glycol monomethyl ether, dipropylene glycol monomethyl ether, tripropylene glycol monomethyl ether, glycerol, dipropylene glycol, tripropylene glycol, tetrapropylene glycol and polypropylene glycol.

The amount of the solvent in the aqueous medium (C) is preferably from 2 to 50 wt %, particularly preferably from 10 to 40 wt %, based on the polymer (A). If the amount of the solvent is too small, no adequate effect for improving the stability of the emulsion is likely to be obtained, and if the amount of the solvent is too much, the washing durability is likely to decrease. Further, the amount of the aqueous medium (C) is preferably from 1 to 5 times by weight, based on the total amount of the polymer (A).

The water and oil repellent composition of the present invention contains the cross-linkable compound (D) as an essential component. The cross-linkable compound (D) is preferably a compound having two or more groups capable of reacting with functional groups present in the polymer (A), and it is preferably a compound having two or more groups which react with hydroxyl groups present in the polymer (A). The cross-linkable compound (D) is preferably, for example, a compound having a blocked isocyanate group ($D^1$), an amino resin compound ($D^2$), a glyoxale type resin compound, a urea type resin compound or a polyethylene imine.

The compound having a blocked isocyanate group ($D^1$), is preferably one having an isocyanate compound having two or more isocyanate groups (hereinafter referred to as a polyfunctional isocyanate) blocked with a blocking agent. The polyfunctional isocyanate is preferably an aliphatic isocyanate. Specifically, it is preferably an aliphatic isocyanate such as hexamethylene diisocyanate, isophorone diisocyanate, 4,4'-dicyclohexylmethane diisocyanate, cyclohexylene diisocyanate or norbornene diisocyanate, and an isocyanurate modified product, a prepolymer modified product or a buret modified product of such an aliphatic isocyanate, is also preferred.

The blocking agent is preferably a compound such as an oxime, a lactam, an alcohol or a phenol, particularly preferably a compound which dissociates within a range of from 60° C. to 180° C. Further, the compound having a blocked isocyanate group ($D^1$) is preferably a compound wherein all of isocyanate groups are blocked, in the IR analysis (i.e. a compound wherein all free isocyanate groups are substantially blocked).

The compound having a blocked isocyanate group ($D^1$) is commercially available as one having a blocked isocyanate compound dispersed by an emulsifier or self-emulsified, and it is preferred to employ such a commercial product.

Further, the amino resin compound ($D^2$) is a compound obtained by addition condensation of an amino group-containing compound with a compound having a group reactive with an amino group. The amino resin compound ($D^2$) is preferably an addition condensate of e.g. melamine, guanamine or urea with an alcohol, an amine or formaldehyde. Further, it may be a compound having an alcohol or an amine further addition condensed to the addition condensate of melamine, guanamine or urea with formaldehyde, or a derivative of such a compound.

Specific examples of the amino resin compound ($D^2$) include a urea resin, a butylated urea resin, a butylated urea melamine resin, trimethylol melamine, hexamethylol melamine, a melamine resin, a methylated methylene resin, a n-butylated melamine resin, a methylated n-butylated melamine resin, an isobutylated melamine resin, a benzoguanamine resin, a n-butylated benzoguanamine resin, an isobutylated benzoguanamine resin, a methylated n-butylated benzoguanamine resin, an acetoguanamine resin, an alkylated urea resin, an alkylated melamine resin, and an alkylated benzoguanamine resin.

Further, as the amino resin compound ($D^2$) in the present invention, it is preferred to employ one which is substantially soluble in water at a normal temperature state. Such an amino resin compound ($D_2$) is commercially available, and various compounds are available. For example, those manufactured by e.g. Sumitomo Chemical Co., Ltd. (such as Sumitex Resin, trade name), Dainippon Ink and Chemicals, Incorporated and Mitsui Chemicals, Inc. The amount of the cross-linkable compound (D) is preferably from 5 to 100 wt %, particularly preferably from 5 to 70 parts by weight, based on the polymer (A).

The water and oil repellent composition of the present invention is an aqueous type water and oil repellent composition containing the polymer (A), the cross-linkable compound (D) and the surfactant (B) in an aqueous medium, and is preferably an aqueous type water and oil repellent composition in such a state that the polymer (A), or the polymer (A) and the cross-linkable compound (D), in the composition, are dispersed or emulsified by the action of the surfactant (D).

The water and oil repellent composition of the present invention is preferably produced by polymerizing a feed material composition comprising a polymerizable monomer for polymerized units in the polymer (A), the surfactant (B) and the aqueous medium (C) to obtain an aqueous dispersion wherein the polymer (A) is dispersed in the aqueous medium (C), and then incorporating the cross-linkable compound (D) into the aqueous dispersion. The cross-linkable compound (D) may be added to the feed material composition or may be added after the polymerization, or it may be added immediately prior to the treatment with the water and oil repellent composition. Further, such a cross-linkable compound (D) may be used alone or two or more types may be used as mixed.

Particularly, in the present invention, it is preferred that the feed composition is emulsified under pressure and then polymerized. In a case where the feed composition is emulsified under pressure, as the polymerizable monomer to be incorporated in the feed material composition, it is preferred to employ a polymerizable monomer which is liquid or solid under the emulsifying condition under pressure. Further, in a case where it is desired to use polymerized units of a polymerizable monomer which is gaseous under the emulsifying condition under pressure, as the polymerized units in the polymer (A), it is preferred that the feed material composition is emulsified under pressure to obtain an emulsified product, and then it is introduced into the emulsified product.

The (meth)acrylate ($a^1$) having a $R^f$ group, the polymerizable monomer ($a^2$) and the polymerizable monomer for the polymerized unit ($A^3$) in the present invention, are polymerizable monomers which are liquid or solid under the usual emulsifying conditions under pressure. Further, a vinyl halide or a vinylidene halide as a polymerization unit for the polymerized units ($A^4$) is a polymerizable monomer which is gaseous under the usual emulsifying conditions under pressure. Further, the polymerizable monomer ($a^5$) for the polymerized units ($A^5$) includes a polymerizable monomer which is liquid or solid and a polymerizable monomer which is gaseous, under the usual emulsifying conditions under pressure, and it is preferably selected for use as the case requires.

When the feed material composition is to be emulsified under pressure, pre-emulsification may be carried out by a method such as stirring preliminarily before the emulsification under pressure. However, in the process of the present invention, such pre-emulsification may not necessarily be carried out.

The emulsification under pressure is preferably carried out by means of a high pressure emulsifying apparatus. As the high pressure emulsifying apparatus, Manton-Gaulin, Hydroshere or Microfluidizer, may, for example, be mentioned. The emulsification under pressure can be carried out simply by maintaining the feed material composition under a pressurized condition, but stirring or the like may be carried out, as the case requires. The pressure during the emulsification is preferably from 1 MPa to 50 MPa (gage pressure). Further, the temperature of the feed material composition under the pressure is preferably from 40 to 80° C.

When the feed material composition is emulsified under pressure, it is possible to form an emulsion of the polymerizable monomers. The average particle size of the polymerizable monomers in the emulsion is preferably from 0.1 to 300 nm. The polymerizable monomer particles contained in the emulsion have a small average particle size and are thermodynamically stable, and they have a merit such that when they are polymerized, almost all of the polymerizable monomer will effectively be reacted.

Further, in a case where after the feed material composition is emulsified under pressure to form an emulsified product, and a polymerizable monomer which is gaseous under the emulsifying condition under pressure, is introduced to the emulsified product, it is preferred to introduce the polymerizable monomer to the feed material composition after the emulsification under pressure.

Further, into the feed material composition, a component (hereinafter referred to as other component) other than the polymerizable monomers, the aqueous medium (C) and the surfactant (B), may be incorporated. As such other component, a chain transfer agent or a pH controlling agent may, for example, be mentioned. In a case where the starting material composition is emulsified under pressure, such other component may be added prior to the emulsification or after the emulsification. In the present invention, it is preferred to add a chain transfer agent to the starting material composition. As the chain transfer agent, a compound represented by the following Formula 16 is preferred, since it is capable of improving various properties of the water and oil repellent composition. The amount of the chain transfer agent may suitably be changed depending upon the molecular weight of the polymer (A).

$$R^{22}SH \qquad \text{Formula 16}$$

In the Formula 16, $R^{22}$ is a $C_{12\text{-}18}$ alkyl group.

Polymerization of the feed material composition is preferably carried out by an emulsion polymerization method. As the emulsion polymerization method, it is preferred to employ a technique of a common emulsion polymerization method. Specifically, it is preferred to employ a method wherein polymerization is carried out by adding a polymerization initiator to the feed material composition after the emulsification under pressure. The polymerization initiator is not particularly limited, and a usual polymerization initiator such as an organic peroxide, an azo compound or a persulfate, or an ionizing radiation such as γ-ray may be employed. The reaction temperature for the polymerization reaction may suitably be changed depending upon the radical initiator to be used, and it is preferably from 30 to 80° C. The reaction time is preferably from 4 to 70 hours.

The aqueous dispersion obtained by the polymerization reaction may be used as it is, as the water and oil repellent composition of the present invention, or may be diluted, as the case requires. When it is diluted, it is preferably diluted with water and/or an organic solvent, particularly preferably with water only. The aqueous dispersion obtained by the process of the present invention has high stability and has a merit such that the stability is maintained even when a contaminant is present. Further, in a case where an organic solvent is employed for dilution, it is preferred to employ the above-mentioned water-soluble organic solvent, and particularly when the aqueous medium (C) is composed of water and a water-soluble organic solvent, it is preferred to employ one which is the same as the water-soluble organic solvent.

According to the process, an aqueous dispersion type composition having the polymer (A) dispersed in the aqueous medium (C), is obtainable. The polymer (A) dispersed in the aqueous medium (C) is preferably dispersed in a particulate form. The average particle size of the polymer (A) particles is preferably from 0.03 to 0.25 µm.

The aqueous dispersion in the present invention is used as a water and oil repellent composition having excellent water and oil repellency. The aqueous dispersion is diluted to an optional concentration depending upon the purpose, application, etc., and is applied to an object to be treated. The application method to the object to be treated may also be an optional method depending upon the type of the object to be treated or the prepared formulation of the composition. For example, a method may be employed wherein it is deposited on the surface of the object to be treated by a coating method such as dip coating, followed by drying. Further, if necessary, it is applied together with a suitable cross-linking agent, followed by curing.

The water and oil repellent composition of the present invention exhibits excellent stability and excellent durability of water and oil repellency also when other compound is used in combination. Accordingly, additives such as another polymer blender, another water and oil repellent, an oil repellent, an insecticide, a flame retardant, an antistatic agent, a dye stabilizer, a crease-preventing agent, etc., may be used in combination as the case requires.

The object to be treated with the water and oil repellent composition of the present invention is not particularly limited, and a fiber fabric, glass, paper wood, leather, fur, asbestos, brick, cement, a metal and its oxide, a porcelain product, or a plastic, may, for example, be mentioned. Preferred is a fiber fabric.

As the fiber fabric, a fabric of an animal or plant natural fiber such as cotton, hemp, wool or silk, a synthetic fiber such as polyamide, polyester, polyvinyl alcohol, polyacrylonitrile, polyvinyl chloride or polypropylene, a semi-synthetic fiber such as rayon or acetate, an inorganic fiber such as glass fiber or carbon fiber, or a mixed fiber thereof, may be mentioned.

Further, a fiber or fiber product treated with the aqueous dispersion obtained by the process of the present invention is capable of exhibiting superior water and oil repellency against various physical actions, to one treated with a conventional water and oil repellent composition. Namely, it is capable of exhibiting washing resistance and dry cleaning resistance. Further, the object treated with the water and oil repellent composition of the present invention is capable of exhibiting excellent water and oil repellency without coloration even when applied to a polyamide fiber of a pale color type. Further, by suitably selecting the composition in the aqueous dispersion of the present invention, it is possible to provide a water and oil repellent composition which is advantageous also from the viewpoint of the environmental problem.

The mechanism whereby the water and oil repellent composition of the present invention has excellent performance, is not necessarily clearly understood. However, it is considered that as it has specific polymerized units, the cross-linking efficiency has increased, whereby a water and oil repellent coating film having a high quality which has not heretofore been possible, has been formed to provide the excellent performance.

The water and oil repellent composition of the present invention exhibits excellent water and oil repellent washing durability to fibers of various materials, as compared with conventional water and oil repellent compositions. Further, even when applied to a polyamide fiber fabric of a pale color type, it is excellent in the water and oil repellency and its durability. Further, the fiber treated with the water and oil repellent composition of the present invention has excellent hand.

EXAMPLES

Now, the present invention will be described in detail with reference to Examples (Examples 1 to 8 and 11 to 14) and Comparative Examples (Examples 9 and 10), but the present invention is by no means restricted thereto.

Example 1

A perfluoroalkylethyl acrylate $[F(CF_2)_n CH_2CH_2OCOCH=CH_2$, wherein n is a mixture of from 6 to 16, and the average value of n is 9, hereinafter referred to as FA] (230 g), $CH_2=CHCOOCH_2CH_2O\{CO(CH_2)_5O\}_2H$ (DCEA, 25.5 g), octadecylmercaptan (StSH, 0.77 g), polyoxyethylene monooleyl ether (PEOOE, 15.4 g), trimethylmonooctadecylammonium chloride (StTMAC, 5.1 g), dipropylene glycol (DPG, 90 g) and deionized water (350 g) were stirred at 50° C. for 30 minutes. Then, the mixture was emulsified under 20 MPa by means of a high pressure emulsifier (Manton-Gaulin) while maintaining the temperature at a level of from 40 to 50° C. The average particle size of the emulsion after the emulsification was 0.23 µm.

Then, this emulsion was transferred to a 1 l autoclave made of glass, and azobis(2-amidinopropane) dihydrochloride (0.5 g) was added. The interior of the autoclave was substituted by nitrogen, and the temperature was raised to 60° C. with stirring, and polymerization was carried out for 6 hours to obtain a milky white emulsion. The average molecular weight of the polymer in the emulsion was 91,000, and the concentration of the solid content contained in the emulsion was 38.2 wt %, and the average particle size of the polymer was 0.10 µm. The emulsion was diluted with deionized water so that the solid content concentration of the polymer became 16 wt %, and the solid content concentration of Takenate WB730 (a self emulsifierable type aliphatic blocked isocyanate, manufactured by Takeda Chemical Company, Ltd., solid content concentration: 45%) became 4 wt %, and the obtained solution was designated as stock solution 1.

Example 2

FA (230 g), $CH_2=C(CH_3)COO(CH_2CH_2O)_4H$(TEGMA, 25.5 g), StSH (0.77 g), polyoxyethylene (1-methylundecyl ether) (PEOLE, 15.4 g), StTMAC (5.1 g), dipropylene glycol monomethyl ether (DPGMME, 90 g) and deionized water (350 g) were stirred at 50° C. for 30 minutes. Then, the mixture was emulsified under 20 MPa by means of a high pressure emulsifier (Manton-Gaulin) while maintaining the temperature at a level of from 40 to 50° C. The average particle size of the emulsion after the emulsification was 0.21 µm.

Then, the emulsion was transferred to a 1 l autoclave made of glass, and azobis(2-amidinopropane) dihydrochloride (0.5 g) was added. The interior of the autoclave was substituted by nitrogen, and the temperature was raised to 60° C. with stirring, and polymerization was carried out for 6 hours to obtain a milky white emulsion. The average molecular weight of the polymer in the emulsion was 88,000, and the concentration of the solid content contained in the emulsion was 37.9 wt %, and the average particle size of the polymer was 0.08 µm. The emulsion was diluted with deionized water so that the solid content concentration of the polymer became 16 wt %, and the solid content concentration of Elastron BN-08 (a self-emulsifying fatty acid blocked isocyanate, manufactured by Daiichi Kogyo Yakuhin K.K., solid content concentration: 35%) became 4 wt %, and the obtained solution was designated as stock solution 2.

Example 3

FA (154 g), octadecyl acrylate (StA, 77 g), TEGMA (25.5 g), StSH (0.77 g), PEOLE (15.4 g), StTMAC (5.1 g), DPGMME (90 g) and deionized water (350 g) were stirred at 50° C. for 30 minutes. Then, the mixture was emulsified under 20 MPa by means of a high pressure emulsifier (Manton-Gaulin) while maintaining the temperature at a level of from 40 to 50° C. The average particle size of the emulsion after the emulsification was 0.20 µm.

Then, this emulsion was transferred to a 1 l autoclave made of glass, and azobis(2-amidinopropane) dihydrochloride (0.5 g) was added. The interior of the autoclave was substituted by nitrogen, and the temperature was raised to 60° C. with stirring, and polymerization was carried out for 6 hours to obtain a milky white emulsion. The average molecular weight of the polymer in the emulsion was 89,000, and the concentration of the solid content contained in the emulsion was 37.8 wt %, and the average particle size of the polymer was 0.08 µm. The emulsion was diluted with deionized water so that the solid content concentration of the polymer became 16 wt %, and the solid content concentration of Takenate WB730 became 4 wt %, and the obtained solution was designated as stock solution 3.

Example 4

FA (162 g), StA (25.5 g), $CH_2=CHCOOCH_2CH_2O\{CO(CH_2)_5O\}_5H$(PCEA, 25.5 g), N-methylolacrylamide (NMAA, 5.1 g), StSH (0.77 g), PEOOE (10.3 g), a nonionic surfactant (a compound of the Formula 10 wherein the total of x and y is 10, hereinafter referred to as B1, 5.1 g), PEOLE (5.1 g), tripropylene glycol (3PG, 90 g) and deionized water (350 g) were stirred at 50° C. for 30 minutes. Then, the mixture was emulsified under 30 MPa by means of a high pressure emulsifier (Manton-Gaulin) while maintaining the temperature at a level of from 40 to 50° C. The average particle size of the emulsion after the emulsification was 0.17 µm.

Then, this emulsion was transferred to a 1 l autoclave made of glass, and azobis(2-amidinopropane) dihydrochloride (0.5 g) was added, whereupon the interior of the autoclave was substituted by nitrogen. Then, vinyl chloride (VCL, 38.5 g) was added, and the temperature was raised to 60° C. with stirring, and polymerization was carried out for 15 hours to obtain a milky white emulsion. The average molecular weight of the polymer in the emulsion was 80,000, and the concentration of the solid content was 38.1 wt %, and the average particle size of the polymer was 0.07 µm. The emulsion was diluted with deionized water so that the solid content concentration of the emulsion became 16 wt %, and the solid content concentration of Takenate WB730 became 4 wt %, and the diluted solution was designated as stock solution 4.

Example 5

FA (180 g), PCEA (10 g), StSH (0.60 g), PEOOE (12.1 g), StTMAC (4 g), DPG (70 g), Takenate WB730 (89 g) and deionized water (300 g) were stirred at 50° C. for 30 minutes. Then, the mixture was emulsified under 20 MPa by means of a high pressure emulsifier (Manton-Gaulin) while maintaining the temperature at a level of from 40 to 50° C. The average particle size of the emulsion after the emulsification was 0.18 µm.

Then, this emulsion was transferred to a 1 l autoclave made of glass, and azobis(2-amidinopropane) dihydrochloride (0.5 g) was added. The interior of the autoclave was substituted by nitrogen, and the temperature was raised to 60° C. with stirring, and polymerization was carried out for 6 hours to obtain a milky white emulsion. The average molecular weight of the polymer in the emulsion was 91,000, and the concentration of the solid content contained in the emulsion was 37.2 wt %, and the average particle size of the polymer was 0.07 µm. The emulsion was diluted so that the solid content concentration became 20 wt %, and the diluted solution was designated as stock solution 5.

Examples 6 to 9

Using the polymerizable monomers, the water-soluble organic solvent, the surfactant, etc., shown in Table 1, polymerization was carried out in the same manner as in Example 1 or Example 4 to obtain an emulsion. To such an emulsion, the blocked isocyanate shown in Table 1 (the amount is wt %, based on the polymer contained in the emulsion) was added, and diluted with deionized water to obtain stock solutions 6 to 9. In Example 5, the blocked isocyanate was added after the polymerization.

Example 10

The emulsion obtained in Example 1 was diluted with deionized water to a concentration of 20 wt % without adding Takenate WB730, and the diluted solution was designated as stock solution 10.

Example 11

The emulsion prepared in Example 1 was diluted with deionized water so that the solid content concentration became 17 wt %, and the solid content concentration of Sumitex Resin M3 (Sumitomo Chemical Co., Ltd.) became 3 wt %, and the diluted solution was designated as stock solution 11.

Example 12

FA (109 g), vinylidene chloride (VdCL, 73.4 g), cyclohexyl methacrylate (CHMA, 76.1 g), 4-hydroxybutyl acrylate (HBA, 13.6 g), trimethylmonooctadecylammonium chloride (StTMAC 5.1 g), dipropylene glycol (DPG, 90 g) and deionized water (350 g) were stirred at 50° C. for 30 minutes. Then, the mixture was emulsified under 20 MPa by means of a high pressure emulsifier (Manton-Gaulin) while maintaining the temperature at a level of from 40 to 50° C. The average particle size of the emulsion after the emulsification was 0.22 µm.

Then, this emulsion was transferred to a 1 l autoclave made of glass, and azobis(2-amidinopropane) dihydrochloride (0.5 g) was added. The interior of the autoclave was substituted by nitrogen, and the temperature was raised to 60° C. with stirring, and polymerization was carried out for 6 hours to obtain a milky white emulsion. The average molecular weight of the polymer in the emulsion was 85,000, and the concentration of the solid content contained in the emulsion was 38.0 wt %, and the average particle size of the polymer was 0.11 μm. the emulsion was diluted with deionized water so that the solid content concentration of the polymer became 4 wt %, the solid content concentration of Takenate WB730 became 4 wt %, and the solid content concentration of the polymer obtained in Example 1 became 12 wt %, and the diluted solution was designated as stock solution 12.

Example 13

FA (109 g), CHMA (73.4 g), HBA (13.6 g), glycidyl methacrylate (GMA, 76.1 g), trimethylmonooctadecylammonium chloride (StTMAC, 5.1 g), dipropylene glycol (DPG, 90 g) and deionized water (350 g) were stirred at 50° C. for 30 minutes. Then, the mixture was emulsified under 20 MPa by means of a high pressure emulsifier (Manton-Gaulin) while maintaining the temperature at a level of from 40 to 50° C. The average particle size of the emulsion after the emulsification was 0.21 μm.

Then, this emulsion was transferred to a 1 l autoclave made of glass, and azobis(2-amidinopropane) dihydrochloride (0.5 g) was added. The interior of the autoclave was substituted by nitrogen, and the temperature was raised to 60° C. with stirring, and polymerization was carried out for 6 hours to obtain a milky white emulsion. The average molecular weight of the polymer in the emulsion was 90,000, and the concentration of the solid content contained in the emulsion was 38.1 wt %, and the average particle size of the polymer was 0.10 μm. The emulsion was diluted with deionized water so that the solid content concentration of the polymer became 4 wt %, the solid content concentration of Takenate WB730 became 4 wt %, and the solid content concentration of the polymer obtained in Example 1 became 12 wt %, and the diluted solution was designated as stock solution 13.

TABLE 1

| Ex. | Polymerizable monomers (parts by weight) | Water-soluble organic solvent (parts by weight) | Surfactant (parts by weight) | Cross-linkable component |
|---|---|---|---|---|
| 1 | FA/DCEA (90/10) | DPG(35) | PEOOE(6) StTMAC(2) | WB730(25) |
| 2 | FA/TEGMA (90/10) | DPGMME(35) | PEOLE(6) StTMAC(2) | BN-08(25) |
| 3 | FA/StA/TEGMA (60/30/10) | DPGMME(35) | PEOLE(6) StTMAC(2) | WB730(25) |
| 4 | FA/StA/PCEA/ NMAA/VCL (63/10/10/2/15) | 3PG(35) | PEOOE(4), B1(2) PEOLE(2) | WB730(25) |
| 5 | FA/PCEA (90/10) | DPG(35) | PEOOE(6) StTMAC(2) | WB730 |
| 6 | FA/DCEA/ StA/HE6P (60/10/28/2) | DPG(35) | PEOOE(4), B1(2) StTMAC(1, 6) | BN-08(25) |
| 7 | FA/DCEA (80/20) | DPG(35) | PEOOE(6) StTMAC(2) | WB730(25) |
| 8 | FA/DOM/ PCEA/VCL (63/7/10/20) | DPG(35) | PEOOE(4), B1(1) PEOPPO(1) | WB730(25) |
| 9 | FA/HEA (90/10) | DPG(35) | PEOOE(6) StTMAC(2) | WB730(25) |
| 10 | FA/DCEA (90/10) | DPG(35) | PEOOE(6) StTMAC(2) | — |

TABLE 1-continued

| Ex. | Polymerizable monomers (parts by weight) | Water-soluble organic solvent (parts by weight) | Surfactant (parts by weight) | Cross-linkable component |
|---|---|---|---|---|
| 11 | FA/DCEA (90/10) | DPG(35) | PEOOE(6) StTMAC(2) | M-3(18) |

The symbols in Table 1 have the following meanings.
HE6P: a reaction product of a compound having one of isocyanate groups of isophorone diisocyanate blocked with methylethyl ketone oxime, with 2-hydroxyethyl methacrylate,
DOM: dioctyl maleate,
HEA: 2-hydroxyethyl acrylate,
POEL: a polyoxyethylene mono(2-dodecyl)ether containing 15 oxyethylene units,
PEOPPO: polyoxyethylene polyoxypropylene block polymer (a compound of the Formula 11, wherein φ and η are 15, and δ is 35.).

Method for Application to Cloth

Each of stock solutions 1 to 13 obtained as described above, was diluted with deionized water so that the solid content concentration would be 0.5 wt %, to obtain a treating solution. In such a treating solution, a polyester tropical cloth was dipped, and the cloth was squeezed between two rubber rollers to a wet pick up of 60 wt %. Then, it was dried at 110° C. for 90 seconds and further subjected to heat treatment at 170° C. for 60 seconds. With respect to the treated cloth after the treatment, the Bundesmann water repellency and oil repellency, and the Bundesmann water repellency and oil repellency after washing, were measured by the following method, and the results are shown in Table 5.

Further, one diluted with deionized water in the same manner, so that the solid content concentration became 1 wt %, was used as a treating solution. In such a treating solution, a white colored nylon cloth having no FIX agent applied, was dipped, and the cloth was squeezed between two rubber rollers to a wet pick up of 50 wt %. Then, it was dried at 110° C. for 90 seconds and further subjected to heat treatment at 170° C. for 60 seconds. With respect to the treated cloth after the treatment, the water repellency and the oil repellency were measured by the following method, and the results are shown in Table 5.

Further, as Example 14, stock solution 1 was diluted with deionized water so that the solid content concentration became 1.0 wt %, the concentration of Sumitec Resin M-3 (melamine resin, manufactured by Sumitomo Chemical Co., Ltd.) became 0.5%, and the concentration of accelerator ACX (melamine resin catalyst, manufactured by Sumitomo Chemical Co., Ltd.) became 0.5%, and the diluted solution was used as a treating solution. In such a treating solution, a polyester tropical cloth was dipped, and the cloth was squeezed between two rubber rollers to a wet pick up of 60 wt %. Then, it was dried at 110° C. for 90 seconds and further subjected to heat treatment at 170° C. for 60 seconds. With respect to the treated cloth after the treatment, the Bundesmann water repellency and oil repellency, and the Bundesmann water repellency and oil repellency after the washing, were measured by the following methods, and the results are shown in Table 5.

Further, one diluted with deionized water in the same manner so that the solid content concentration became 1.2 wt %, the concentration of Sumitex Resin M-3 (trimethylol melamine resin) became 0.5%, and the concentration of accelerator ACX (melamine resin catalyst) became 0.5%, was used as a treating solution. In this treating solution, a white colored nylon cloth (not treated with a FIX agent) was dipped, and the cloth was squeezed between two rubber rollers to a wet pick up of 50 wt %. Then, it was dried at 110° C. for 90 seconds and further subjected to heat treatment at 170° C. for 60 seconds. With respect to the treated cloth after the treatment, the water repellency and the oil repellency were measured by the following method, and the results are shown in Table 5.

Evaluation of Bundesmann Water Repellency

In accordance with the evaluation method JIS L-1092 rain test (shower method) and employing a Bundesmann rain test apparatus, the water repellency was measured.

TABLE 2

| Water repellency No. | State |
| --- | --- |
| 100 | No wettability observed on the surface |
| 90 | Slight wettability observed on the surface |
| 80 | Partial wettability observed on the surface |
| 70 | Wettability observed on the surface |
| 50 | Wettability observed over the entire surface |
| 0 | Complete wettability observed on both the front and rear surfaces |

Evaluation of the Oil Repellency

The evaluation was carried out in accordance with AATCC-TM118-1966 and represented by the oil repellency number shown in Table 3.

TABLE 3

| Oil repellency No. | Test solution | Surface tension dyn/cm(25° C.) |
| --- | --- | --- |
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | 65 parts of nujol/35 parts of n-hexadecane | 29.6 |
| 1 | Nujol | 31.2 |
| 0 | Less than 1 | — |

Evaluation of Hand

Polyester tropical cloths before and after the treatment, were prepared, and their difference was evaluated by five testers under the following evaluation standards.

○: the same as non-treated cloth or soft.

X: harder than non-treated cloth.

Washing Treatment Method (Five Times of Washing Method)

Into an automatic reverse whirling type electric washing machine (the same performance as VH-1150, manufactured by Toshiba), 800 g of a test cloth (a woven fabric) of 45×45 cm and 25 l of a 0.2 wt % weakly alkaline synthetic detergent (JIS K 3371 weakly alkaline first type) solution of 40±2° C., were put, followed by washing for 25 minutes under intensive conditions. Then, water was removed by a centrifugal spin dryer for about 30 seconds, whereupon rinsing was carried out for 10 minutes while overflowing water of normal temperature. Then, spin drying was again carried out for about 30 seconds, and rinsing was carried out under the same conditions for 10 minutes, whereupon spin drying was carried out for about 30 seconds. The above method was repeated 10 times to obtain a fabric after washing 50 times.

Evaluation of Water Repellency (Nylon Cloth)

The evaluation was carried out by a spray test of JIS-L1092 and represented by the water repellency number as shown in Table 4.

TABLE 4

| Water repellency No. | State |
| --- | --- |
| 100 | No wettability observed on the surface |
| 90 | Slight wettability observed on the surface |
| 80 | Partial wettability observed on the surface |
| 70 | Wettability observed on the surface |
| 50 | Wettability observed over the entire surface |

TABLE 5

| | Initial | | After washing | | Initial (nylon) | | |
| --- | --- | --- | --- | --- | --- | --- | --- |
| Ex. | Water repellency | Oil repellency | Water repellency | Oil Repellency | Water repellency | Oil Repellency | Hand |
| 1 | 100 | 6 | 90 | 5 | 90 | 4 | ○ |
| 2 | 100 | 6 | 80 | 6 | 90 | 3 | ○ |
| 3 | 100 | 6 | 80 | 6 | 90 | 4 | ○ |
| 4 | 100 | 6 | 90 | 6 | 100 | 4 | ○ |
| 5 | 100 | 6 | 80 | 5 | 90 | 3 | ○ |
| 6 | 100 | 6 | 90 | 6 | 100 | 4 | ○ |
| 7 | 100 | 6 | 80 | 4 | 80 | 4 | ○ |
| 8 | 100 | 6 | 80 | 5 | 90 | 3 | ○ |
| 9 | 100 | 6 | 70 | 4 | 70 | 2 | X |
| 10 | 70 | 4 | 0 | 3 | 50 | 0 | ○ |
| 11 | 100 | 6 | 90 | 4 | 90 | 5 | ○ |
| 12 | 100 | 6 | 90 | 5 | 90 | 4 | ○ |
| 13 | 100 | 6 | 90 | 6 | 90 | 5 | ○ |
| 14 | 100 | 6 | 100 | 6 | 100 | 4 | ○ |

What is claimed is:

1. A water and oil repellent composition, comprising:
   (A) a polymer comprising
      ($A^1$) polymerized units of a (meth)acrylate ($a^1$) having a poly-fluoroalkyl group; and
      ($A^2$) polymerized units of a polymerizable monomer ($a^2$) which comprises a polymerizable unsaturated group and a hydroxyl group and in which the polymerizable unsaturated group and the hydroxyl group are connected to each other through 7 or more covalent bonds;
   (B) a surfactant comprising a nonionic surfactant in an amount of from 60 to 100 wt %;
   (C) an aqueous medium selected from the group consisting of i) water only, and ii) a mixture of water and a water-soluble organic solvent; and
   (D) a cross-linkable compound;
   wherein said nonionic surfactant in said surfactant (B) is selected from the group consisting of
      ($b^1$) a nonionic surfactant comprising units obtained from a polyoxyalkylene monoalkyl ether, a polyoxyalkylene monoalkenyl ether or a polyoxyalkylene monoalkpolyenyl ether;

(b²) a nonionic surfactant comprising units obtained from a compound which has at least one carbon-carbon triple bond and at least one hydroxyl group in its molecule and which exhibits a surface activity;

(b³) a nonionic surfactant comprising units obtained from a compound in which a polyoxyethylene moiety having two or more oxyethylenes chained and a moiety having two or more oxyalkylenes having a carbon number of 3 or more chained, are connected, and both terminals are hydroxyl groups;

(b⁴) a nonionic surfactant having an amine oxide moiety in its molecule; and (b⁵) a nonionic surfactant comprising units obtained from a condensate of a polyoxyethylene mono (substituted phenyl) ether, or a polyoxyethylene mono(substituted phenyl) ether.

2. The water and oil repellent composition according to claim 1, wherein said polymerizable unsaturated group and said hydroxyl group of said polymerizable monomer (a²) are connected through 11 or more covalent bonds.

3. The water and oil repellent composition according to claim 1, wherein said polymerizable monomer (a²) has a formula selected from the group consisting of the following formulae 2, 3 and 4:

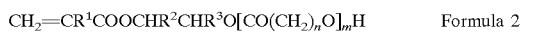  Formula 2

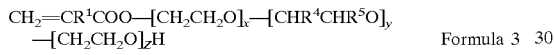  Formula 3

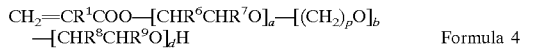  Formula 4 wherein $R^1$, $R^2$, $R^3$, $R^4$, $R^5$, $R^6$, $R^7$, $R^8$, $R^9$ each independently represent a hydrogen atom or a methyl group;

n is an integer of from 2 to 6;

m is an integer of from 1 to 20;

x, y, z each independently represent an integer of from 0 to 30, provided that x+y+z is an integer of 2 or more;

a, b, d each independently represent an integer of from 0 to 30, provided that a+b+d is an integer of 2 or more; and p is an integer of from 3 to 6.

4. The water and oil repellent composition according to claim 1, wherein a proportion of said polymerized units ($A^1$) in said polymer (A) is from 20 to 99 wt %.

5. The water and oil repellent composition according to claim 1, wherein said polymer (A) further comprises ($A^3$) polymerized units selected from the group consisting of polymerized units of i) an alkyl (meth)acrylate wherein the carbon number of the alkyl group is from 1 to 22, ii) polymerized units of a cycloalkyl (meth) acrylate wherein the carbon number of the cycloalkyl group is from 5 to 8 and iii) a combination of i) and ii).

6. The water and oil repellent composition according to claim 5, wherein said alkyl (meth)acrylate has 12 to 22 carbon atoms in said alkyl group.

7. The water and oil repellent composition according to claim 5, wherein a sum of the proportion of said polymerized units ($A^1$) and the proportion of said polymerized units ($A^3$) in said polymer (A) is from 20 to 99 wt %.

8. The water and oil repellent composition according to claim 1, wherein an amount of said surfactant (B) is from 1 to 10 wt % based on said polymer (A).

9. The water and oil repellent composition according to claim 1, wherein said polymer (A) further comprises ($A^4$) polymerized units of a vinyl halide or polymerized units of a vinylidene halide.

10. The water and oil repellent composition according to claim 1, wherein an average particle size of said polymer (A) is from 0.03 to 0.25 μm.

11. The water and oil repellent composition according to claim 1, wherein said cross-linkable compound (D) is a blocked isocyanate compound or an amino resin compound.

12. A fiber or fiber fabric treated with the water and oil repellent composition as defined in claim 1.

13. A process for producing a water and oil repellent composition, comprising:

emulsifying under pressure and polymerizing a feed material composition comprising a (meth)acrylate ($a^1$) having a polyfluoroalkyl group, a polymerizable monomer ($a^2$) which comprises a polymerizable unsaturated group and a hydroxyl group and in which the polymerizable unsaturated group and the hydroxyl group are connected to each other through 7 or more covalent bonds, a surfactant (B) comprising a nonionic surfactant in an amount of from 60 to 100 wt %; and an aqueous medium (C) an aqueous medium selected from the group consisting of i) water only, and ii) a mixture of water and a water-soluble organic solvent, to obtain an aqueous dispersion having a polymer (A) dispersed in said aqueous medium (C), and incorporating a cross-linkable compound (D) to said aqueous dispersion;

wherein said nonionic surfactant in said surfactant (B) is selected from the group consisting of (b¹) a nonionic surfactant comprising units obtained from a polyoxyalkylene monoalkyl ether, a polyoxyalkylene monoalkenyl ether or a polyoxyalkylene monoalkpolyenyl ether;

(b²) a nonionic surfactant comprising units obtained from a compound which has at least one carbon-carbon triple bond and at least one hydroxyl group in its molecule and which exhibits a surface activity;

(b³) a nonionic surfactant comprising units obtained from a compound in which a polyoxyethylene moiety having two or more oxyethylenes chained and a moiety having two or more oxyalkylenes having a carbon number of 3 or more chained, are connected, and both terminals are hydroxyl groups;

(b⁴) a nonionic surfactant having an amine oxide moiety in its molecule; and (b⁵) a nonionic surfactant comprising units obtained from a condensate of a polyoxyethylene mono (substituted phenyl) ether, or a polyoxyethylene mono(substituted phenyl) ether.

14. The process according to claim 13, wherein said feed material composition further comprises a compound of the following formula 16:

  Formula 16 wherein $R^{22}$ in the formula 16 represents a $C_{12-18}$ alkyl group.

15. An article treated with the water and oil repellent composition according to claim 1.

16. The article according to claim 15, which comprises a fiber.

17. The article according to claim 15, which comprises a polyamide fiber.

* * * * *